Patented Feb. 13, 1923.

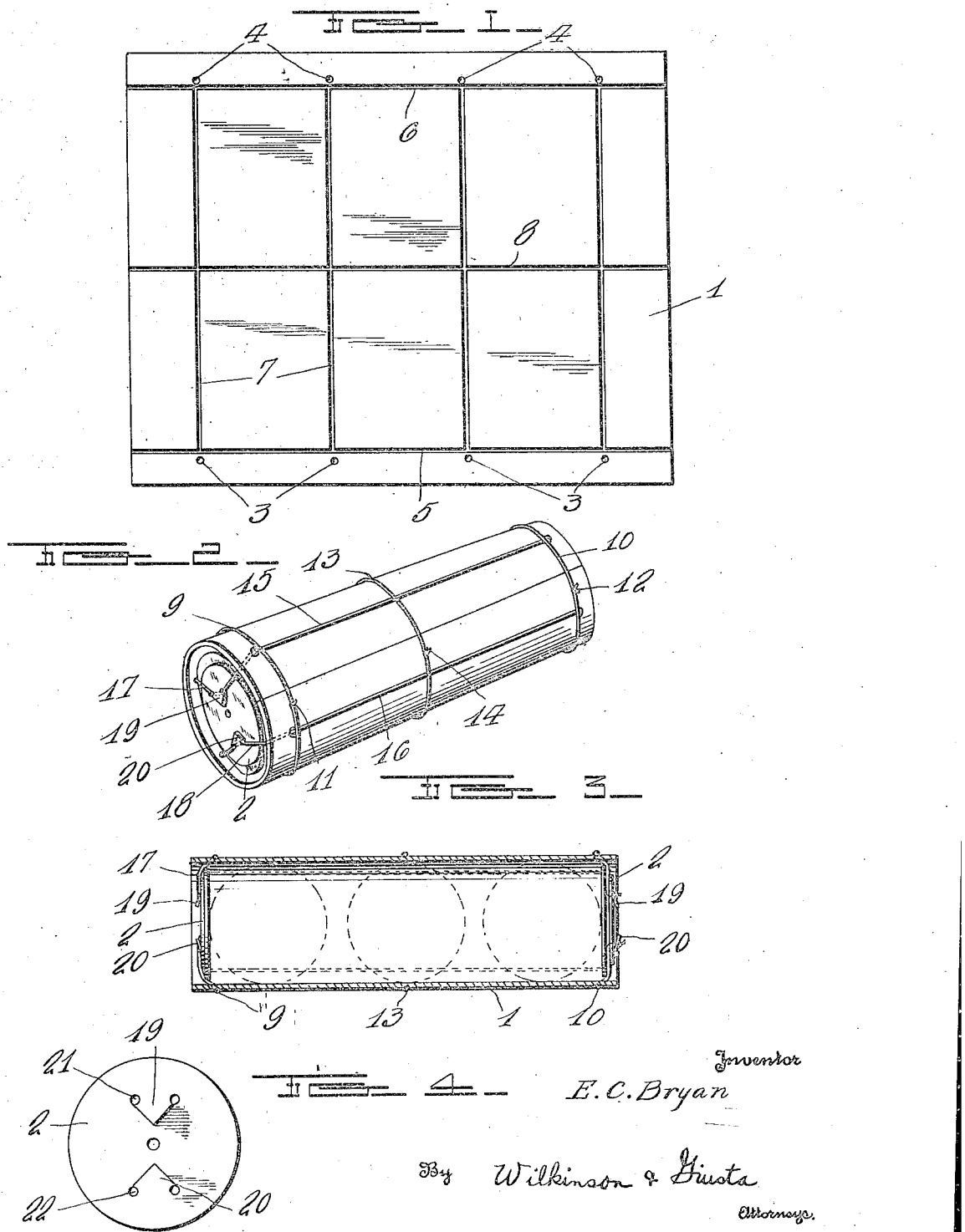

1,445,479

UNITED STATES PATENT OFFICE.

EUGENE COLBERT BRYAN, OF KISSIMMEE, FLORIDA.

FRUIT CONTAINER.

Application filed October 12, 1921. Serial No. 507,193.

*To all whom it may concern:*

Be it known that I, EUGENE COLBERT BRYAN, a citizen of the United States, residing at Kissimmee, in the county of Osceola and State of Florida, have invented certain new and useful Improvements in Fruit Containers; and I do hereby declare the following to be a full, clear, and exact description of the invention, such as will enable others skilled in the art to which it appertains to make and use the same.

The present invention relates to improvements in fruit containers and has for an object to provide an improved container for grapefruit or other like fruit or material in which the container will admit of being folded out into a flat condition to take up a minimum of space and enable the device with economy to be reshipped.

Another object of the invention resides in providing an improved fruit container of a simple yet durable construction in which the fruit will be preserved against injury during transit and which will be inexpensive to manufacture and capable of being readily set up and knocked down.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a plan view of the container body laid out in a flat condition;

Fig. 2 is a perspective view of the set-up container;

Fig. 3 is a longitudinal sectional view therethrough; and,

Fig. 4 is an elevation of one of the heads.

Referring more particularly to the drawings, wherein only a single embodiment of the invention is shown, 1 designates a container body which may be made of leather or other suitable flexible material which is capable of being rolled into a cylindrical form such for instance as shown in Fig. 2, and 2 are the end heads which enclose the space encompassed by the body 1 when so rolled. The heads are intended to confine the fruit or other articles in the container space. The container body 1 will of course be of sufficiently stout material to resist collapse incident to rough handling during shipment and to avoid bruising the fruit.

Near the ends of the body 1 are made a number of perforations 3 and 4, shown in Fig. 1 to be four in number. Adjacent these perforations and running parallel with the lines of perforations, are grooves 5 and 6 cut or otherwise produced in the exterior surface of the body 1. These grooves 5 and 6 are intersected by similarly produced transverse grooves 7 parallel to each other and extending at substantially right angles to said grooves 5 and 6.

The body 1 is provided further with a groove 8 which is centrally arranged and intersects the transverse grooves 7. These various grooves are adapted to receive string or wire to bind the body 1 into the cylindrical form against possible opening and to further join with the heads 2 to hold the latter in place. For instance as shown in Fig. 2, end wires or cords 9 and 10 may be caused to pass about in the grooves 5 and 6, the wires having their ends twisted together and drawn taut as indicated at 11 and 12.

In a similar way the central groove 8 is occupied by a wire 13 with its ends twisted together as indicated at 14. Wire is found to be an excellent means for binding the container body in place as it is stout and reinforces the body, resisting its possible collapse and is readily cut from the container body or removed when the container has reached its destination.

The perforations 3 and 4 are adapted to admit of wires 15 and 16, which occupy the transverse grooves 7, to pass inwardly of the space circumscribed by the cylindrical container body and in the wires are formed loops 17 and 18 which are adapted to engage in triangular tongues 19 and 20 struck outwardly from the heads 2 which are preferably of spring metal. The tongues 19 and 20 are with advantage located upon diametrically opposite sides of the heads with their points or apexes pointing toward one another and with their wider basal portion merging with the material of the heads and forming spring hinges upon which the tongues 19 and 20 may open when the loops 17 and 18 are forced therein; it being understood that by virtue of resiliency of the tongues, they will return to a normally closed position upon the loops and bind the wires and heads together.

Cut out portions 21 and 22 are made at the sides of the basal portions of the tongues where they merge with the heads in order to permit of a resilient action of the tongues, a free hinging thereof, and to receive the loops 17 and 18 which are locked therein by the tongues. The tongue constructions are thus reduced at their inner ends by the provision of these cut away parts 21 and the result of this is that bights are formed in the loops 17 and 18 beneath the tongues 19 and 20 and by virtue thereof the parts are effectually secured together until such time as direct pressure is imposed on the tongues to permit of freeing the wires.

In use, the container is set up in the condition shown in Figs. 2 and 3 where the body is rolled to cylindrical shape and secured by passing the wires or other fastening means thereabout. Grapefruit or other fruit or material is then loaded in endwise to the container space and the heads 2 thereafter put in place and engage with the loops 17 and 18. The container is now ready for shipment. After it arrives at its destination, it is but a simple matter to disengage the tongues from the heads and permit of the removal of one of the heads. Access is thereby had to the interior or contents of the device and as soon as the contents have been removed, the wires may be disengaged and the container body 1 caused to assume the flat condition shown in Fig. 1. The heads 2 may be laid thereon or they may be shipped back separately also in a flat condition to the point of distribution and the containers there again assembled as their use is required.

The device will admit of the using a number of times of a single container and will thereby decrease the cost of shipment of foodstuffs and provide for better and more durable containers to convey the articles to the customer so that he should receive them in a better condition.

It is obvious that various changes and modifications may be made in the details of construction and design of the above specifically described embodiment of this invention without departing from the spirit thereof, such changes and modifications being restricted only by the scope of the following claims:

What is claimed is:

1. A container comprising a cylindrical body, end heads therefor having spring tongues thereon, and fastening means passing longitudinally of the body and having loops formed therein adapted to engage said spring tongues of the heads, substantially as described.

2. A container comprising a cylindrical body having longitudinal and transverse intersecting grooves therein and perforations along the edges of the same, wires passing about the longitudinal grooves for securing the body in cylindrical form, other wires passing along the transverse grooves and entering the perforations, said last mentioned wires having loops formed at the ends of the container, and heads placed in the ends of the container and having spring tongues struck outwardly therefrom in substantially triangular form in diametrically opposite sides of the heads with their apex portions pointing toward one another and having cut away portions at their basal parts to engage the loops, substantially as described.

3. A container comprising a body portion of flexible but stout material adapted to be rolled into cylindrical shape, and having transverse grooves in the outer face thereof, fastening means passing about said body portion and engaging in said grooves and holding the body portion in cylindrical form, end heads for closing the ends of the cylinder, and fastening means passing longitudinally over the body of the cylinder and engaging said heads, substantially as described.

EUGENE COLBERT BRYAN.